Oct. 12, 1937.  L. A. McNABB  2,095,670
POWER SPRING MECHANISM
Filed July 30, 1934  2 Sheets-Sheet 1
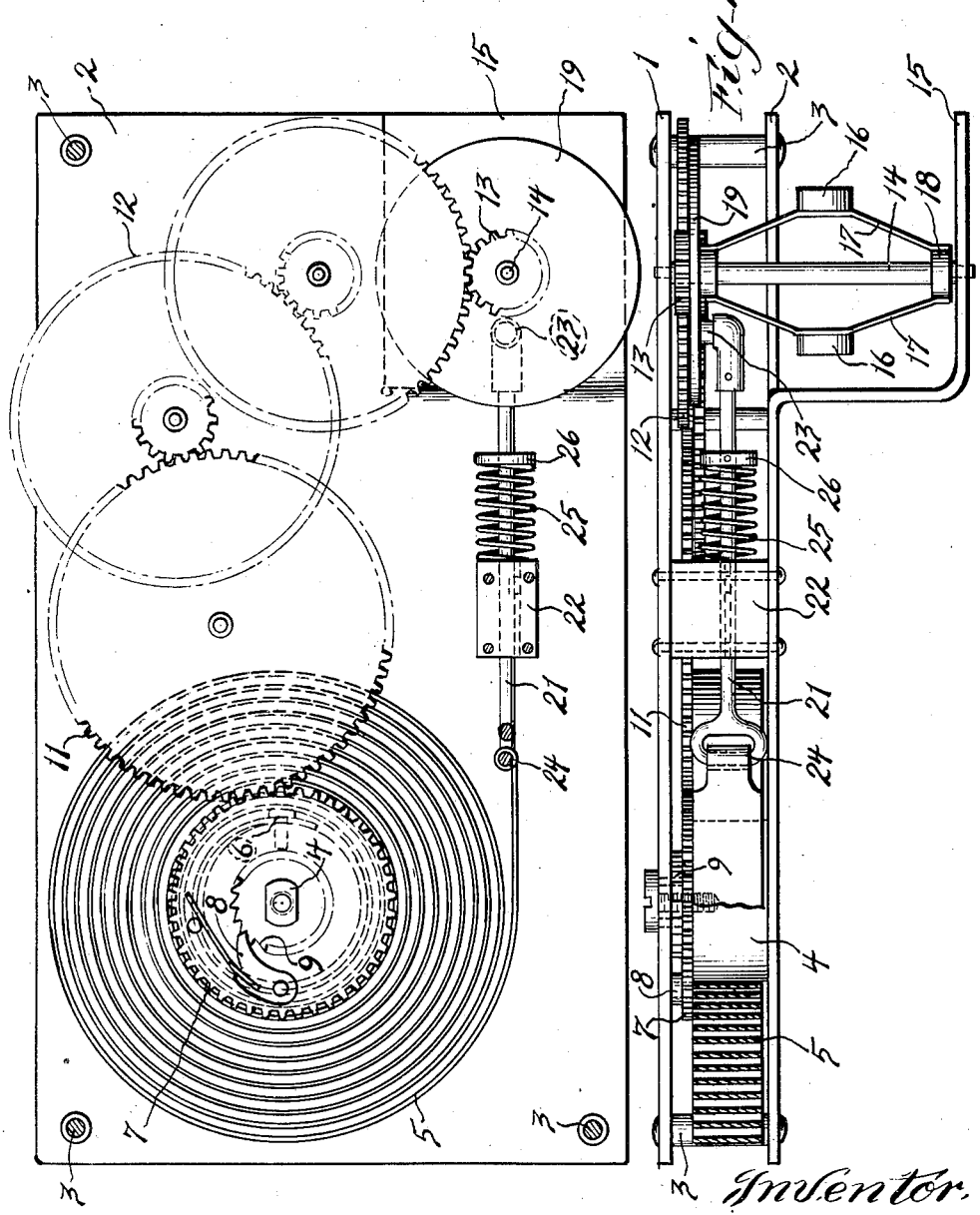
Inventor.
Louis A. McNabb
By Robert F. Miehle
Atty.

Oct. 12, 1937. L. A. McNABB 2,095,670
POWER SPRING MECHANISM
Filed July 30, 1934 2 Sheets-Sheet 2
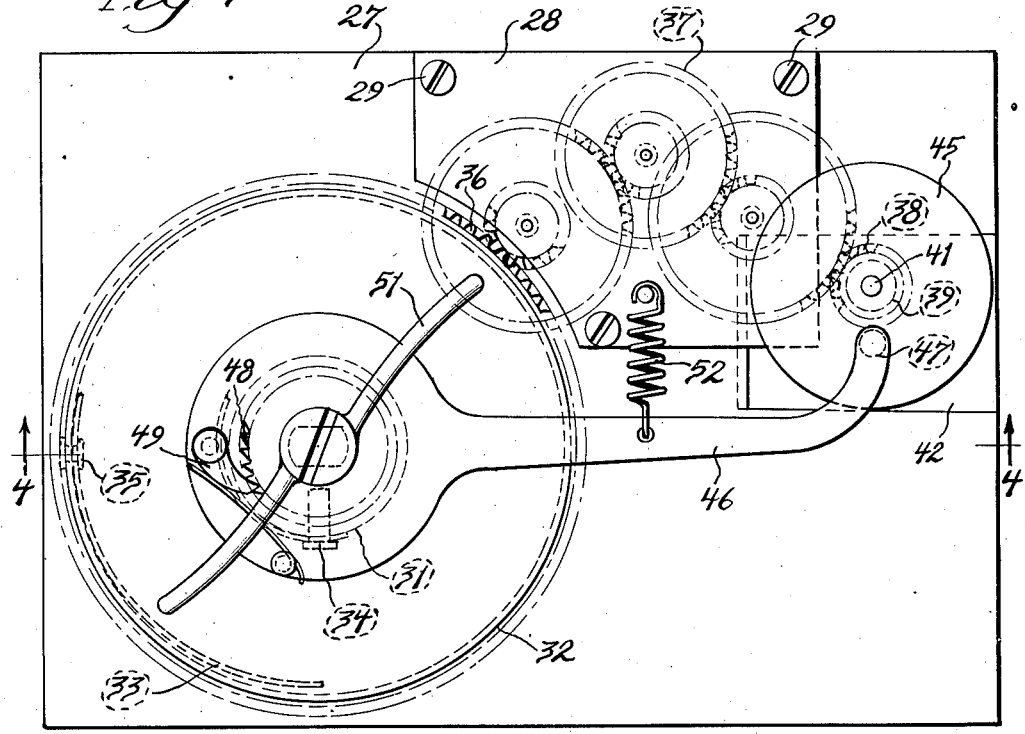
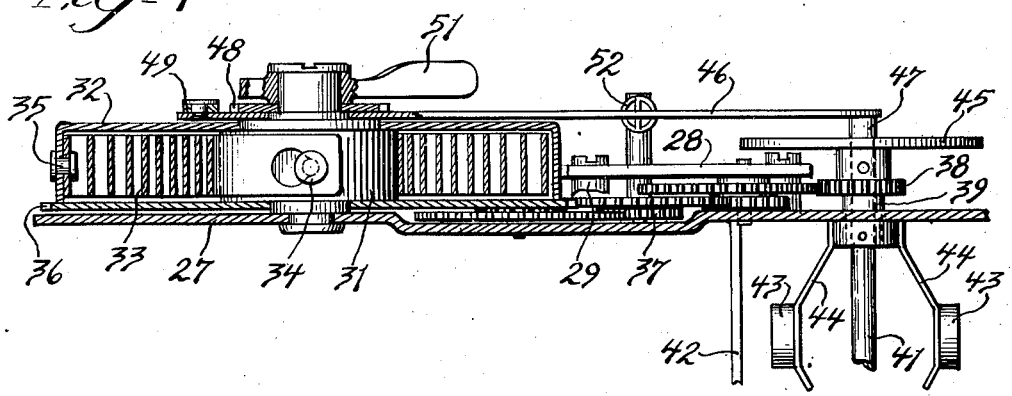
Inventor.
Louis A. McNabb
By Robert F. Miehl, Atty.

Patented Oct. 12, 1937

2,095,670

UNITED STATES PATENT OFFICE 2,095,670

POWER SPRING MECHANISM

Louis A. McNabb, Evanston, Ill., assignor to The Bell & Howell Company, Chicago, Ill., a corporation of Illinois Application July 30, 1934, Serial No. 737,555

5 Claims. (Cl. 185—37)

My invention relates particularly to spring driven motion picture cameras although not limited to this use alone.

The primary object of my invention resides in the provision of novel and effective means whereby a spring driven mechanism is controlled as to speed all with a view toward maintaining a constant speed on the mechanism throughout a relatively great range of tension variation of the driving spring.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is a side elevation of a spring driven mechanism embodying my invention with one of the frame plates thereof removed;

Figure 2 is a bottom plan view of the same with the power spring thereof broken away and shown in partial section;

Figure 3 is a side elevation of a spring driven mechanism embodying a modification of my invention; and Figure 4 is a section on the line 4—4 of Figure 3.

Referring to Figures 1 and 2 of the drawings, a frame is formed of plates 1 and 2 secured in spaced parallelism by studs 3, and mounted for rotation on and extending across between the plates 1 and 2 is a hub 4. A coiled power spring 5 surrounds the hub 4 and has its inner end secured to the hub as designated at 6.

A gear 7 is rotatably mounted on the hub 4 at one side of the spring 5, and is provided with a spring pressed pawl 8 engaging a ratchet wheel 9 secured on the hub for driving the gear 7 from the power spring and for permitting winding of the spring by rotating the hub as by a suitable key or handle not shown. The outer or reaction end of the spring 5 is held relatively stationary in a manner hereinafter described.

The gear 7 meshes with a rotatable gear 11 carried by the frame between the plates 1 and 2 for driving the same, and the gear 11 meshes with the primary gear of a multiplying gear train, generally designated at 12, for driving the same from the power spring, power being taken off from the multiplying gear train for utilizing the energy of the power spring as is usual.

Associated with and driven by the final gear 13 of the gear train 12 is a centrifugal speed governor which consists as follows:

A relatively long shaft 14 is secured to and carries the gear 13 and extends across between and is rotatably mounted on the plate 1 and an offset portion 15 of the plate 2. Governor weights 16 are mounted on the intermediate portions of springs 17 which have one of their ends secured on an enlargement 18 of the shaft 14 adjacent the portion 15 of the plate 2 and which have their other ends secured to the hub of a friction disk 19 slidably mounted on the shaft 14.

A rod 21 is slidably keyed in a bore through a bearing block 22 secured between the plates 1 and 2, and is disposed radially of the disk 19 and is provided at one end with a friction member 23 engageable against a face of the disk 19 and against which the disk is pressed by the action of centrifugal force upon the weights 16, as the mechanism is driven, to control the speed thereof.

The other end of the rod 21 is secured with the outer or reaction end of the power spring 5, as designated at 24, and a spring 25 encircles the rod 21 and, reacting on the block 22, engages a collar 26 secured on the rod 21 to urge the rod in the direction to oppose the tension of the power spring and to urge the friction member 23 toward the axis of the disk 19.

Obviously, the governor has increased controlling or braking power as the distance between the axis of the disk 19 and the point of contact thereof with the friction member 23 increases and less as this distance decreases, and the friction member, being adjustable radially of the disk, is thus adjustable to vary the controlling or braking power of the governor.

The tension of the power spring 5 opposed by the spring 25 serves to adjust the friction member 23 to vary the controlling or braking power of the governor in accordance with the varying tension of the power spring.

Thus, when the power spring is fully wound, the friction member 23 is positioned a relatively great distance from the axis of the disk 19. As the power spring unwinds, its tension decreases and the spring 25 moves the friction member 23 closer to the axis of the disk, so that while affording adequate controlling or braking power the controlling or braking power is decreased as the tension on the power spring decreases to the end that a relatively great run of the mechanism at a uniform speed is afforded.

Referring to Figures 3 and 4, these figures disclose another embodiment of my invention as applied to a power spring mechanism in which the winding of the spring is effected from the reaction end thereof.

In these figures, the frame is formed of a main plate 27 and an auxiliary plate 28 secured in spaced parallelism with the plate 27 by means of studs 29. A hub 31 is rotatably mounted on the plate 27, and a spring casing 32 is rotatably mounted on the hub.

A coiled power spring 33 is disposed within the casing 32 and has its inner end secured with the hub 31, as designated at 34, and has its outer end secured with the casing, as designated at 35.

The casing 32 is provided with a gear 36 which forms the primary gear of a multiplying gear train, generally designated at 37, and which is thus driven by the power spring 33, power being taken off from the multiplying gear train for utilizing the energy of the power spring as is usual.

The multiplying gear train 37 is inclusive of a final gear 38 which is secured on a sleeve 39 rotatably mounted in a bore through the plate 27, and a relatively long shaft 41 is engaged for rotation and for longitudinal movement in the bore of the sleeve 39 and is similarly engaged in a bore of an offset portion 42 of the plate 27 which offset portion is similar to the offset portion 15 of the plate 2 of Figures 1 and 2.

Governor weights 43 are mounted on the intermediate portions of springs 44 which have one of their ends secured with the shaft 41 in a manner similar to that in which the springs 17 are secured to the shaft 14 of Figures 1 and 2, and the other ends of the springs 44 are secured to the sleeve 39, whereby the shaft 41 is shiftable axially under the control of the springs 44 cooperating with the weights 43 which are subject to centrifugal force during rotation of the shaft 41.

A friction disk 45 is secured on the shaft 41 for rotation and axial movement therewith, and an arm 46 is mounted, by means of a bore therethrough at one end thereof, on the hub 31, and has a friction element 47 mounted on its other end which is engageable against a face of the disk 45 and against which the disk is pressed by the action of centrifugal force upon the weights 43, as the mechanism is driven, to control the speed thereof, the friction element being movable radially of the disk 45 with pivotal movement of the arm 46.

A ratchet wheel 48 is secured on the hub 31, and a spring pressed pawl 49 is mounted on the arm 46 and engages the ratchet wheel 48 for the winding of the power spring 33 by rotation of the hub 31, as by a handle 51 secured on this hub, the reaction of the tension on the spring 33 being transmitted to the arm 46 in the direction to move the friction element 47 away from the axis of the disk 45 which movement is opposed by a spring 52 acting on the arm 46 to urge the same in the direction to move the friction element 47 toward the axis of the disk 45.

The action of the governor device of Figures 3 and 4 is the same as that of Figures 1 and 2 fully described above.

Having thus described my invention, I do not wish to be limited to the precise details described as changes may be readily made without departing from the spirit of my invention. I claim as new and desire to secure by Letters Patent the following:

1. In a power spring mechanism the combination with a power spring, of a centrifugal speed controlling governor operatively connected therewith and including a member adjustable to vary the controlling power of the governor, a connection between the reaction end of said power spring and said adjustable member adapted to actuate said adjustable member in the direction to increase the braking power of said governor by means of the tension on said power spring, and a second spring urging said adjustable member in the opposite direction to decrease the controlling power of said governor as the tension of said power spring decreases.

2. In a power spring mechanism the combination with a power spring and a multiplying gear train connected with said power spring to be driven thereby, a braking device comprising a revoluble member provided with a radial surface of revolution and driven by said gear train and a second relatively stationary member frictionally engaged with said surface and adjustable radially thereof, and means responsive to the amount of tension on said power spring and adapted to actuate said second member toward the axis of said revoluble member as the tension on said power spring decreases and to permit said power spring to actuate said second member away from said axis as the tension on said power spring increases.

3. In a power spring mechanism the combination with a power spring and a multiplying gear train connected with one end of said power spring to be driven thereby, a braking device comprising a revoluble member provided with a radial surface of revolution driven by said gear train and a second relatively stationary member frictionally engaged with said surface and adjustable radially thereof, a connection between the other end of said power spring and said second member adapted to actuate said second member away from the axis of said revoluble member by means of the tension of said power spring, and a second spring adapted to urge said adjustable member toward said axis in opposition to said power spring.

4. In a power spring mechanism the combination with a power spring and a multiplying gear train connected with said power spring to be driven thereby, a centrifugal speed governor including a centrifugally controlled axially shiftable revoluble member provided with a radial surface of revolution and driven by said gear train and a second relatively stationary member frictionally engaged with said surface and adjustable radially thereof, and means responsive to the amount of tension on said power spring and adapted to actuate said second member toward the axis of said revoluble member as the tension on said power spring decreases and to permit said power spring to actuate said second member away from said axis as the tension on said power spring increases.

5. In a power spring mechanism the combination with a power spring and a multiplying gear train connected with one end of said power spring to be driven thereby, a centrifugal speed governor including a centrifugally controlled axially shiftable revoluble member provided with a radial surface of revolution and driven by said gear train and a second relatively stationary member frictionally engaged with said surface and adjustable radially thereof, a connection between the other end of said power spring and said second member adapted to actuate said second member away from the axis of said revoluble member by means of the tension of said power spring, and a second spring adapted to urge said adjustable member toward said axis in opposition to said power spring.

LOUIS A. McNABB.